Nov. 10, 1953  E. E. MALLORY  2,658,691
PLY STOCK MAGAZINE
Filed Sept. 27, 1950  3 Sheets-Sheet 1

INVENTOR.
EDWIN E. MALLORY
BY
Oberlin + Limbach
ATTORNEYS.

Nov. 10, 1953 E. E. MALLORY 2,658,691
PLY STOCK MAGAZINE
Filed Sept. 27, 1950 3 Sheets-Sheet 3

INVENTOR.
EDWIN E. MALLORY
BY
Oberlin & Limbach
ATTORNEYS.

Patented Nov. 10, 1953

2,658,691

UNITED STATES PATENT OFFICE 2,658,691

PLY STOCK MAGAZINE

Edwin E. Mallory, Cuyahoga Falls, Ohio, assignor to National Rubber Machinery Company, Akron, Ohio, a corporation of Ohio Application September 27, 1950, Serial No. 187,095

7 Claims. (Cl. 242—64)

The present invention relates generally as indicated to a ply stock magazine and more particularly to a portable ply stock magazine or dolly which includes a ply stock supply roll from which ply stock is adapted to be unwound for use in building pneumatic tires and a liner roll onto which the liner which separates the convolutions of the ply stock on the first-mentioned roll is adapted to be wound to thus feed or unwind the ply stock. Of course, when the ply stock roll is empty, the magazine or dolly may be reloaded by winding ply stock together with the liner from the liner roll onto the ply stock roll.

In the building of pneumatic tires several layers of ply stock are successively wrapped around a tire building drum, each ply stock generally comprising a strip of rubber covered or impregnated fabric with the cords disposed in parallel relation diagonally of the strip or on a bias. Said ply stock is flexible and readily distorted and hitherto difficulty has been experienced, particularly with ply stock having nylon cords, in the angular distortion of the ply stock due to non-uniform tensioning of the stock incidental to any manual lifting or handling of the same. Such angular distortion results in the application around the tire building drum of ply stock in which the cords, instead of extending in straight diagonal and parallel lines from one edge of the stock to the other as is desired, extend in curved non-parallel lines with the cords spaced apart different distances across the width of the stock. Obviously, the application of such stock around the drum is not conducive to the production of tires which are of uniform strength and flexing characteristics.

Accordingly, it is one important object of this invention to provide a ply stock magazine which eliminates the aforesaid by making possible the winding of the bias cut stock on accurately aligned liner rolls immediately the bias cut has been made and all subsequent manipulation of such bias stock, such as is necessary in transporting the bias cut stock from the bias cutter to the exact location for application to the building drum, occurs while the stock is supported on or by such accurately aligned rolls.

Another object of this invention is to provide a ply stock magazine of the character referred to which enhances the life of the liner and reduces the necessity for liner repairs, said magazine enabling substantial savings in that satisfactory results and long life are obtained even with a liner which is not of the best grade.

Still another object of this invention is to provide a magazine or dolly of the character referred to which is of a simple, portable, and lightweight form adapted to be detachably mounted onto a stock servicer to enable convenient unwinding of the ply stock from the ply stock roll onto the tire building drum. The light weight and ease of manipulation of the magazine and its rolls makes possible also the maintainence of a loop of stock just ahead of the building drum which loop and the withdrawal of the stock from the liner drum to supply such loop, is such as to place a minimum of distorting stress on the stock. Said magazine, when the ply stock roll is empty, is readily removable from the stock servicer and transportable to a ply stock bias cutter and windup machine whereat pieces of ply stock are spliced together in a slightly overlapped relationship and wound together with the liner from the liner roll onto the empty ply stock roll.

Other objects and advantages will become apparent as the following description proceeds.

To the accomplishment of the foregoing and related ends, said invention, then comprises the features hereinafter fully described and particularly pointed out in the claims, the following description and the annexed drawing setting forth in detail one illustrative embodiment of the invention, this being indicative, however, of but one of the various ways in which the principle of the invention may be employed.

Figure 1:
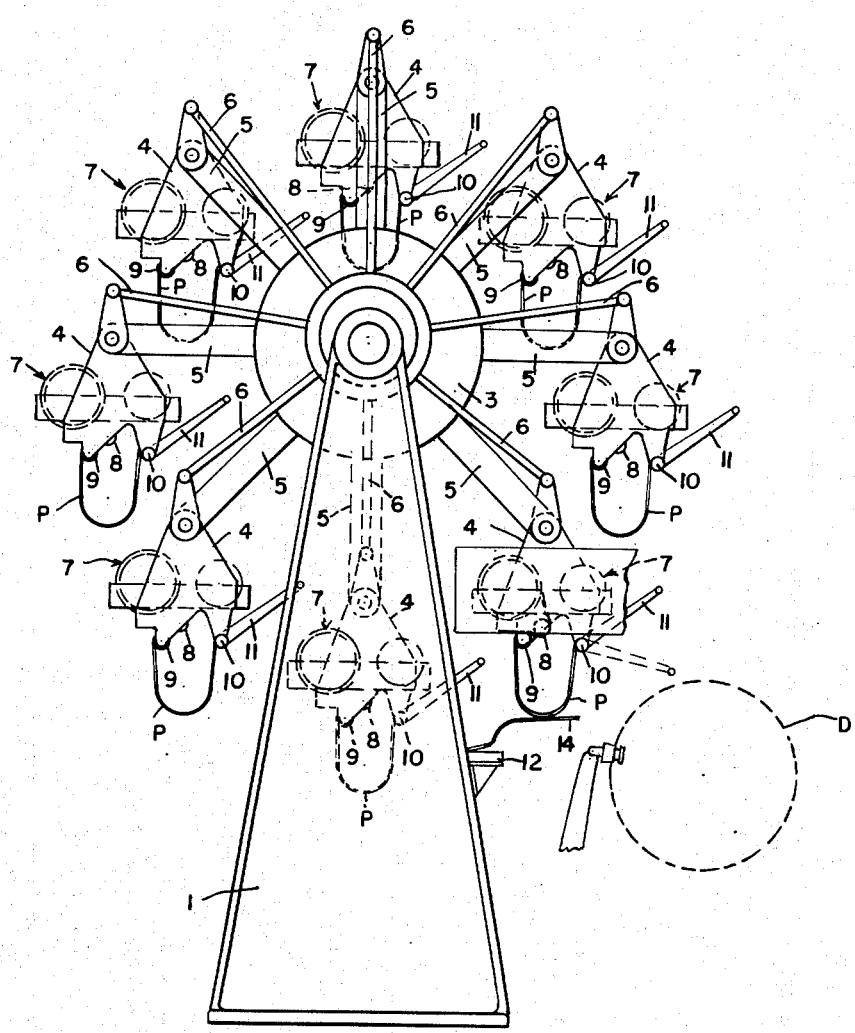
Fig. 1 is a side elevation view of a typical ply stock servicer of the ferris-wheel type.
Figure 2:
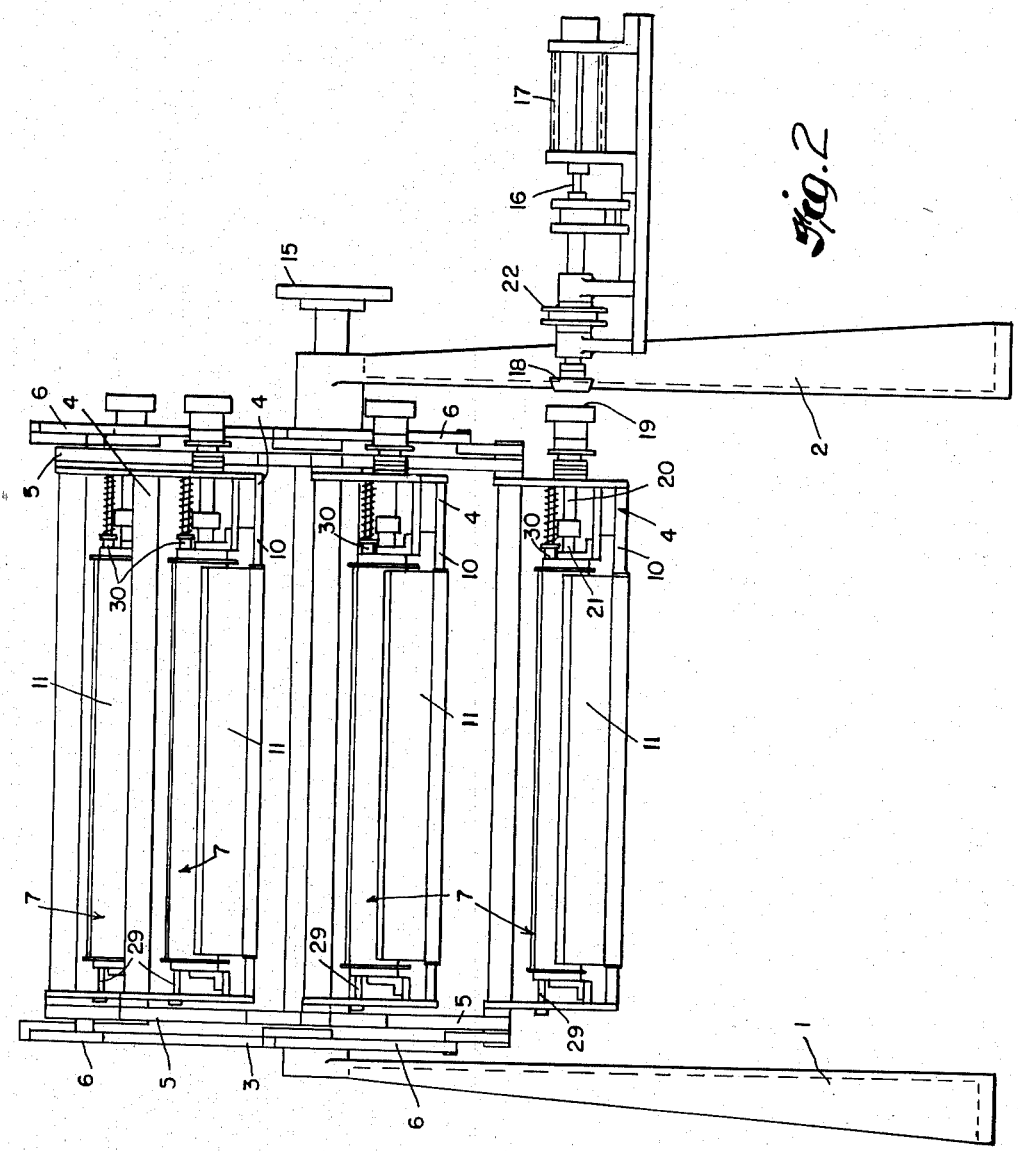
Fig. 2 is a front elevation view of the stock servicer illustrated in Fig. 1.

Referring now to the drawing and first more particularly to Figs. 1 and 2, the stock servicer therein illustrated comprises spaced upstanding supports 1 and 2 between which a ferris-wheel hanger assembly 3 is journalled for rotation about a horizontal axis, said assembly 3 comprising hangers or cradles 4 pivotally connected to the outer ends of radially disposed arms 5. Said hangers 4 are held in vertical position by means of stabilizer rods 6.

Detachably connected to each hanger 4 is a ply stock magazine or dolly 7 from which ply stock P passes over rolls 8 and 9 on said hanger 4 and hangs in the form of a catenary with the free end of the stock P passing over a roll 10 also mounted on the hanger 4 onto a stock servicer tray 11, said tray 11 being adapted to be actuated downwardly to the position shown in dotted lines at the right side of Fig. 1 when it is desired to wrap a length of the looped stock P onto the adjacent tire building drum D.

The drive means for the magazine 7 to feed the ply stock P so as to form the aforesaid loop is controlled by a switch 12 which is actuated by an arm 14, said arm being engaged by the bottom of the loop as shown in Fig. 1. Said arm 14 is disposed so as to maintain a sufficient length of ply stock P to preclude the possibility of the operator of the tire building machine from stretching the stock during the application thereto to the drum D.

Said stock servicer is indexed by suitable means (not shown) upon operation of the control part 15 of the ferris wheel assembly 3 to successively position the magazines 7 adjacent the drum D.

The driving of the magazines 7 to loop the ply stock P is effected through a drive shaft 16 which is reciprocated as by means of an air cylinder 17 to effect alternate engagement and disengagement between the complementary clutch elements 18 and 19 on said drive shaft 16 and on a driven shaft 20 respectively, said driven shaft 20 having a wrench portion 21 thereon which is engaged with the respective magazine 7. Said drive shaft 16 is power driven through the pulley 22 slidably keyed thereon.

The stock servicer itself is of conventional well-known form and has herein been illustrated to enable a fuller understanding of the present invention.

Figure 3:
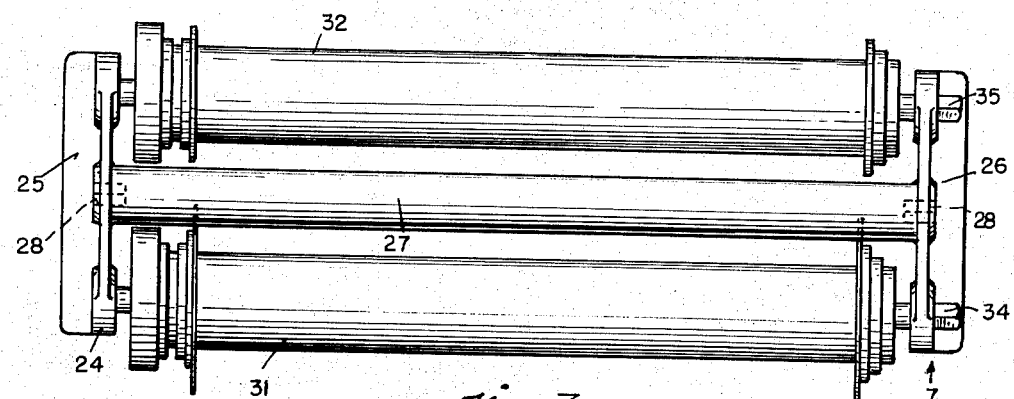
Fig. 3 is a top plan view of the magazine constituting the present invention.
Figure 4:
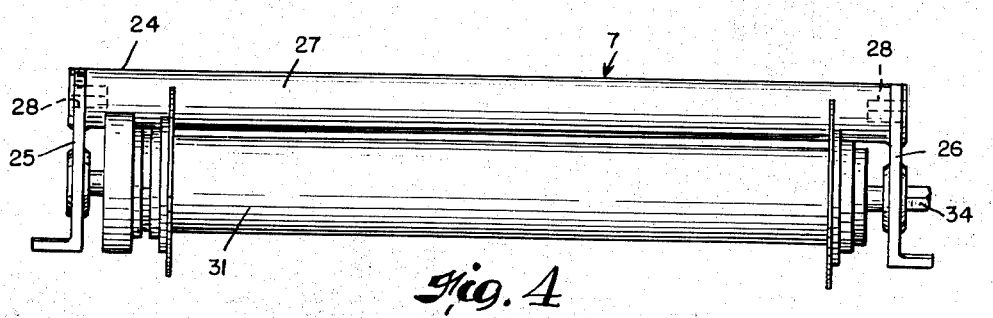
Fig. 4 is a front elevation view of the magazine illustrated in Fig. 3.
Figure 5:
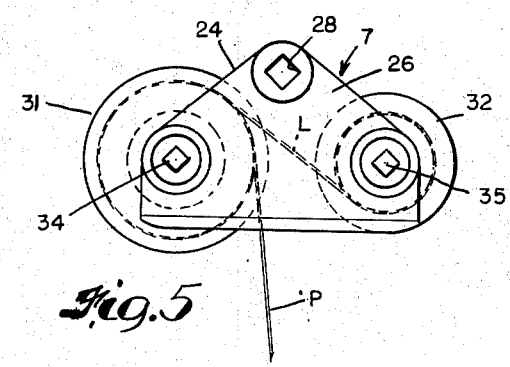
Fig. 5 is an end elevation view of the magazine illustrated in Figs. 3 and 4.

As best shown in Figs. 3, 4 and 5, each magazine 7 comprises a carrier 24 which includes a pair of spaced-apart brackets 25 and 26 joined together by means of a bar 27. Said bar 27 is formed with sockets 28 of non-circular cross-section at its opposite ends into which rods 29 and 30 of complementary cross-section are adapted to be fitted in order to hold the magazine 7 in the hanger 4 of the stock servicer or to hold the magazine in some other apparatus such as the magazine wind-up machine previously referred to. One or both of said rods 29 and 30 are mounted for axial movement and at least one of said rods herein the rod 30 is preferably spring loaded as shown in Fig. 2 in order to enable quick and convenient mounting and dismounting of the magazine from its hanger 4.

Journalled in the brackets 25 and 26 are the opposite ends of a pair of parallel rolls 31 and 32, each having a projecting end 34 and 35 respectively, of non-circular cross-section and in the case of the stock servicer just described, the end 35 of the liner roll 32 will have engagement in the wrench 21 of the driven shaft 20 whereby the winding of the liner L (see Fig. 5) onto said roll 32 will unwind the ply stock P to form the loop as shown in Fig. 1 and in the case of the magazine wind-up, the end 34 of roll 31 will be driven to unwind the liner L from roll 32 onto the roll 31 together with the spliced ply stock P.

It can thus be seen that with the present form of ply stock magazine 7 the magazines will be periodically removed from the stock servicer as the ply stock P thereon is used up, the empty magazines 7 being replaced with filled ones and, of course, the empty magazines 7 together with the wound-up liner roll L on roll 32 will be transported to the magazine wind-up machine for winding ply stock P onto the ply stock roll 31 together with the liner L taken from the liner roll 32. It is to be noted that the liner L always remains with each magazine 7 and because of the parallel disposition of the ply stock and liner rolls 31 and 32, there is always a parallel and uniform rewind and takeup of the ply stock P and liner L. It is further to be noted that the replacement of the magazines 7 may be readily accomplished without requiring shutting down of the servicer and similarly the ply stock supply unit may be arranged so that while one magazine 7 is being filled, another is being loaded into position for being filled.

Other modes of applying the principle of the invention may be employed, change being made as regards the details described, provided the features stated in any of the following claims or the equivalent of such be employed.

I, therefore, particularly point out and distinctly claim as my invention:

1. A portable ply stock magazine comprising parallel ply stock supply and liner rolls, and a support integrally formed at opposite ends with a pair of spaced apart brackets journalling the end portions of said rolls, each of said rolls being provided with a driving member accessible from an end of said support and through which said rolls may be selectively driven to wind a liner from said liner roll, together with ply stock, onto said supply roll and to wind such liner from said supply roll onto said liner roll to thus unwind the ply stock.

2. In a ply stock magazine and hanger assembly, the combination of a portable magazine comprising opposed spaced brackets, a bar extending between said brackets and securing the latter in fixed relation to each other, and ply stock supply and liner rolls parallel to each other and to said bar, and having their opposite ends journalled in said brackets, and a hanger detachably carrying said magazine, said magazine and hanger being provided with interfitting detent and socket elements mounted for relative disengaging movement in a direction generally parallel to the axes of said rolls.

3. In a ply stock magazine and hanger assembly, the combination of a portable magazine comprising parallel ply stock supply and liner rolls, and a support integrally formed at opposite ends with a pair of spaced apart brackets journalling the opposite end portions of said rolls, said support being formed with a socket at each end, and a hanger detachably carrying said magazine, said hanger being provided with opposed detent elements insertable into such sockets of said support.

4. In combination, a stock servicer comprising a rotatable member, a plurality of radially extending arms on said member, hangers pivotally suspended from the outer ends of the respective arms, ply stock magazines detachably carried by the respective hangers, said magazines each comprising a support, and parallel ply stock and liner rolls journalled in said support, said ply stock rolls each having ply stock wound therearound with a liner leading from the respective liner rolls disposed between the convolutions of the ply stock, and means for successively driving said liner rolls of said magazines whereby to wind the liner thereonto from the associated ply stock roll and thus feed the ply stock for building pneumatic tires.

5. In the process of constructing pneumatic tire casings on a rotatable tire building drum, the steps of winding ply stock onto a roll of a portable magazine together with a liner unwound from a parallel roll of the magazine, transporting the loaded magazine from the ply stock supply source to a ply stock servicer disposed adjacent the drum, mounting the loaded magazine on the servicer, and rewinding the liner onto the last-named parallel roll while holding the free end of the ply stock so that the feeding of the ply stock by the unwinding of the liner from the first roll causes the ply stock to hang in the form of a catenary, applying the hanging portion of the ply stock around the drum, and driving the roll onto which the liner is thus rewound to maintain a hanging portion of the ply stock during the application of ply stock around the drum.

6. In combination, a stock servicer comprising a rotatable member, a plurality of hangers carried by said member at circumferentially spaced points around the latter, ply stock magazines detachably carried by the respective hangers, said magazines each comprising a carrier, and parallel ply stock and liner rolls journalled in said carrier, said ply stock rolls each having ply stock wound therearound with a liner leading from the respective liner rolls disposed between the convolutions of the ply stock, and means for successively driving said liner rolls of said magazines whereby to wind the liner thereonto from the associated ply stock roll and thus feed the ply stock for building pneumatic tires.

7. A portable ply stock magazine comprising parallel ply stock supply and liner rolls, and a support having a pair of spaced apart brackets fixed thereto for journalling the end portions of said rolls, each of said rolls being provided adjacent one end with an element of a separable driving connection through which said rolls may be selectively driven to wind the liner from said liner roll, together with ply stock, onto said supply roll and to wind such liner from said supply roll onto said liner roll to thus unwind the ply stock.

EDWIN E. MALLORY.

References Cited in the file of this patent

UNITED STATES PATENTS

| Number | Name | Date |
| --- | --- | --- |
| 1,491,282 | Abbott, Jr. et al. | Apr. 22, 1924 |
| 2,277,476 | Bostwick | Mar. 24, 1942 |
| 2,441,791 | Bostwick | May 18, 1948 |